(12) United States Patent
Peterson et al.

(10) Patent No.: US 12,417,763 B2
(45) Date of Patent: Sep. 16, 2025

(54) CHANGE OF DIGITAL ASSISTANT VOICE FREQUENCY BASED ON MATCHING FREQUENCY FROM ENVIRONMENT

(71) Applicant: LENOVO (SINGAPORE) PTE. LTD., Singapore (SG)

(72) Inventors: Nathan Peterson, Morrisville, NC (US); Gary D Cudak, Morrisville, NC (US); John M. Petersen, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 297 days.

(21) Appl. No.: 18/191,249

(22) Filed: Mar. 28, 2023

(65) Prior Publication Data
US 2024/0331688 A1    Oct. 3, 2024

(51) Int. Cl.
| | | |
|---|---|---|
| *G10L 15/22* | (2006.01) | |
| *G10L 15/20* | (2006.01) | |
| *G10L 21/007* | (2013.01) | |
| *G10L 25/51* | (2013.01) | |

(52) U.S. Cl.
CPC .............. *G10L 15/20* (2013.01); *G10L 15/22* (2013.01); *G10L 21/007* (2013.01); *G10L 25/51* (2013.01)

(58) Field of Classification Search
CPC .... G06F 3/167; G10L 15/22; G10L 2015/225
See application file for complete search history.

(56) References Cited

U.S. PATENT DOCUMENTS

| | | | |
|---|---|---|---|
| 10,147,439 B1 * | 12/2018 | Kristjansson | ......... G10L 21/034 |
| 11,070,864 B2 * | 7/2021 | Wässingbo | ......... H04N 21/2387 |
| 2004/0193422 A1 * | 9/2004 | Fado | ......... H03G 3/32 |
| | | | 704/260 |
| 2009/0063141 A1 * | 3/2009 | Huang | ............... G10L 21/0208 |
| | | | 704/226 |
| 2018/0316795 A1 * | 11/2018 | Yang | ....................... G06F 3/167 |
| 2020/0329330 A1 * | 10/2020 | Mitchell | .............. H04R 29/007 |
| 2024/0045645 A1 * | 2/2024 | Hu | .......................... G06F 3/165 |

* cited by examiner

*Primary Examiner* — Daniel Abebe
(74) *Attorney, Agent, or Firm* — John M. Rogitz; John L. Rogitz

(57) ABSTRACT

In one aspect, a device includes a processor and storage with instructions executable to identify a first frequency range of sound associated with an environment and to determine whether the first frequency range matches a second frequency range at least to within a threshold. The second frequency range is associated with a voice of a digital assistant. Responsive to the first frequency range matching the second frequency rage at least to within the threshold, the instructions are executable to change a setting for the digital assistant so that the voice of the digital assistant outputs audio in a third frequency range that does not match the first frequency range at least to within the threshold.

20 Claims, 5 Drawing Sheets

CHANGE OF DIGITAL ASSISTANT VOICE FREQUENCY BASED ON MATCHING FREQUENCY FROM ENVIRONMENT

FIELD

The disclosure below relates to technically inventive, non-routine solutions that are necessarily rooted in computer technology and that produce concrete technical improvements. In particular, the disclosure below relates to techniques changing a digital assistant's voice frequency based on a matching frequency from the audio environment.

BACKGROUND

Digital assistants can be used in a variety of contexts to provide information, execute certain tasks, send communications to other people, etc. As part of these processes, the digital assistant might provide an audio output to the user via a computer-generated voice. However, as recognized herein, there may be instances where other audio exists in the same frequency range as the digital assistant's own voice, which can make hearing the digital assistant itself more difficult or even impossible. There are currently no adequate solutions to the foregoing computer-related, technological problem.

SUMMARY

Accordingly, in one aspect a first device includes at least one processor and storage accessible to the at least one processor. The storage includes instructions executable by the at least one processor to identify a first frequency range of sound associated with an environment and to determine whether the first frequency range matches a second frequency range at least to within a threshold. The second frequency range is associated with a voice of a digital assistant. The instructions are also executable to, responsive to the first frequency range matching the second frequency range at least to within the threshold, change a setting for the digital assistant so that the voice of the digital assistant outputs audio in a third frequency range that does not match the first frequency range at least to within the threshold.

In some example implementations, the first frequency range may be identified based on input from a microphone. So, for example, the sound may include a person speaking or singing, ambient sound, and/or audio from a second device different from the first device. In some specific examples, the first device may even include the microphone.

Additionally or alternatively, the first frequency range may be identified in certain example implementations based on input from an audio output device and/or audio output software. Here the sound may include audio produced by the audio output device and/or audio output software, where the audio may be different from the voice of the digital assistant.

Also in addition to or in lieu of the foregoing, the first frequency range may be identified from a profile associated with a person who is determined to currently be within the environment.

Still further, in certain example implementations the instructions may be executable to, responsive to the first frequency range not matching the second frequency range at least to within the threshold, decline to change the setting for the digital assistant.

Additionally, if desired the first device may include at least one speaker, and the instructions may be executable to control the speaker to output audio in the third frequency range using the voice of the digital assistant based on changing the setting.

In another aspect, a method includes identifying a first frequency range of sound associated with an environment. The method also includes determining whether the first frequency range matches a second frequency range at least to within a threshold. The second frequency range is associated with a voice of a digital assistant. The method then includes, responsive to the first frequency range matching the second frequency range at least to within the threshold, controlling the digital assistant to output audio in a third frequency range that does not match the first frequency range at least to within the threshold.

In certain examples, the third frequency range may be set as a default frequency range for the voice of the digital assistant responsive to the first frequency range matching the second frequency range at least to within the threshold.

Additionally or alternatively, the method may include, responsive to the first frequency range matching the second frequency range at least to within the threshold, controlling the digital assistant to output audio for a threshold amount of time in the third frequency range. Then responsive to the threshold amount of time ending, the method may include subsequently controlling the digital assistant to output audio in the second frequency range.

Also in addition to or in lieu of the foregoing, the method may include, responsive to the first frequency range matching the second frequency range at least to within the threshold, controlling the digital assistant to output audio in the third frequency range while a person associated with the first frequency range is present in the environment. Responsive to determining that the person is no longer present in the environment, the method may then include subsequently controlling the digital assistant to output audio in the second frequency range.

In various examples, the first frequency range may be identified based on input from a microphone, based on input from a second device different from the first device, and/or from a profile associated with a person. The person may be determined to be currently within the environment via facial recognition, voice identification, and/or device identification.

In still another aspect, at least one computer readable storage medium (CRSM) that is not a transitory signal includes instructions executable by at least one processor to identify a first frequency range of sound. The instructions are also executable to determine whether the first frequency range matches a second frequency range at least to within a threshold. The second frequency range is associated with a voice of a digital assistant. The instructions are also executable to, responsive to the first frequency range matching the second frequency range at least to within the threshold, control the digital assistant to output audio in a third frequency range that is different from the first frequency range and that are different from the second frequency range.

In certain example embodiments, the instructions may be executable to determine that a person is present within an audio environment for at least a threshold non-zero amount of time. So responsive to the first frequency range matching the second frequency range at least to within the threshold and responsive to determining that the person is present within the audio environment for at least the threshold non-zero amount of time, the instructions may be executable to control the digital assistant to output audio in the third frequency range.

Also in certain example embodiments, the digital assistant may be executed as part of navigational assistance provided via a navigational assistance application.

The details of present principles, both as to their structure and operation, can best be understood in reference to the accompanying drawings, in which like reference numerals refer to like parts, and in which:

DETAILED DESCRIPTION

Figure 1:
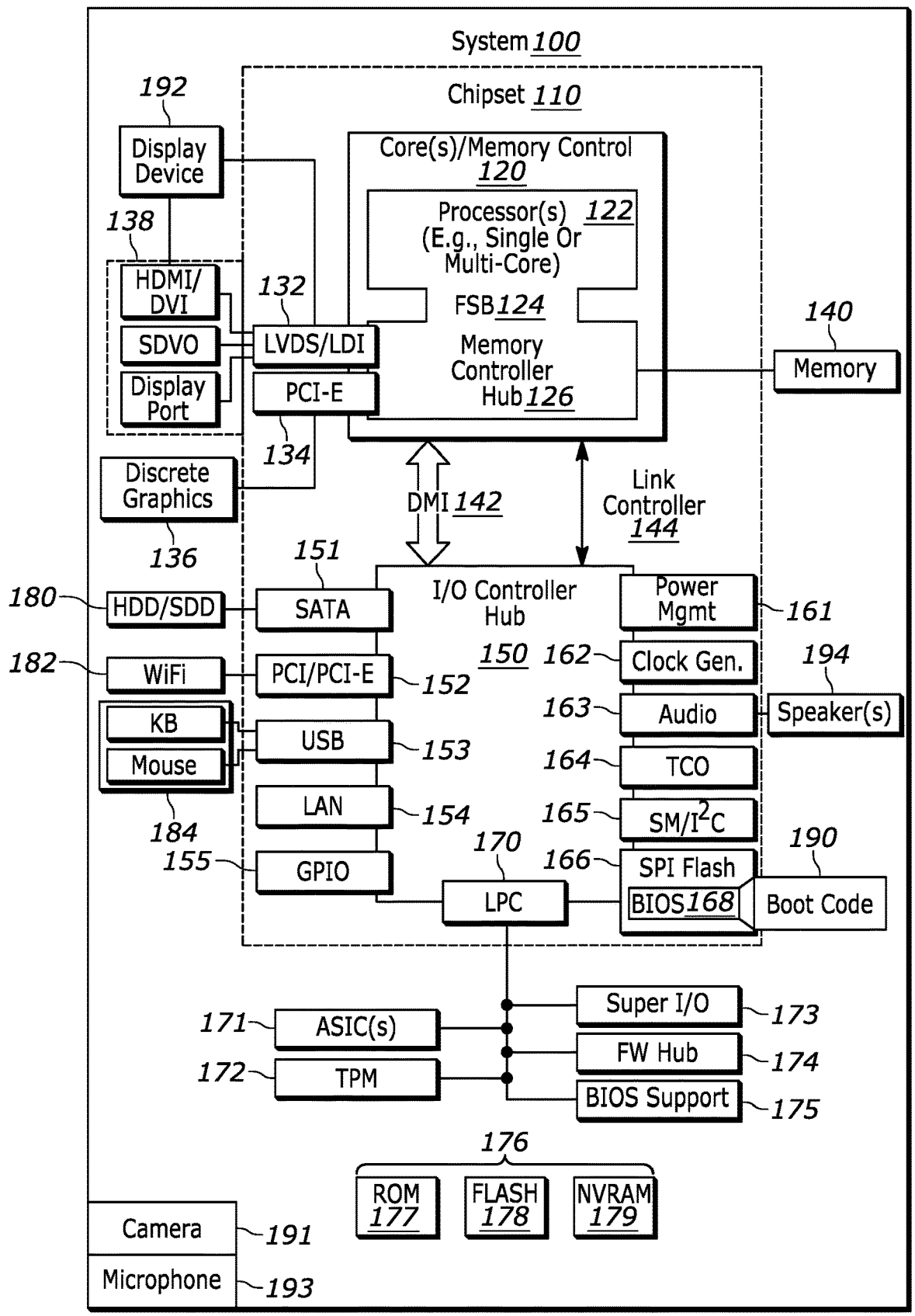
FIG. 1 is a block diagram of an example system consistent with present principles.

Among other things, the detailed description below describes a digital voice that may be used within a vehicle (or applied at another voice-based digital device). The digital device may sample the voices of people around it or that are regularly in the vehicle. A profile for each occupant may then be created and stored for later use. After the initial training data is collected, when specific individuals are detected as being present again, the digital device may determine that a different tone/frequency for the digital voice should be used when providing audible output so that the digital voice may still be heard even if, for example, the digital voice and one or more actual people are talking at the same time.

Thus, in one specific example the vehicle/device may learn or be given the voice profile data for various occupants. When an occupant is present that has a voice tone/frequency that conflicts/overlaps with that of the digital voice, the digital voice may be modified to no longer conflict (e.g., human has range of 180-185 Hz and digital voice has range of 182-187 Hz, resulting in 3 Hz overlap between 182 Hz and 185 Hz). This may be done by changing the tone/frequency of the digital voice dynamically on the fly, and/or by picking a different preexisting voice profile for the digital voice that is already available and that is known not to conflict. Additionally, this technology may be adaptive so that a new permanent/default assistant voice may be set based on regular occupants, or a dissonant assistant voice may just be used as the operative one when specific occupants are in the vehicle that have conflicting voice frequencies (without making that one the overall default).

However, further note that while a vehicle example has been discussed above, this technology may be used for any digital device that has voice feedback/functionality, such as digital home assistants, digital assistants operating on mobile devices such as smart phones, etc.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors such as a camera 191 that gathers one or more images and provides the images and related input to the processor 122 (e.g., for facial recognition consistent with present principles). The camera 191 may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Another example sensor that may be included in the system 100 is an audio receiver/microphone 193 that provides input from the microphone to the processor 122 based on audio that is detected, such as via a user providing audible input to the microphone to interact with a digital assistant. Voice recognition may also be executed using input from the microphone 193 to identify a person present within an audio environment sensible by the microphone 193 consistent with present principles.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
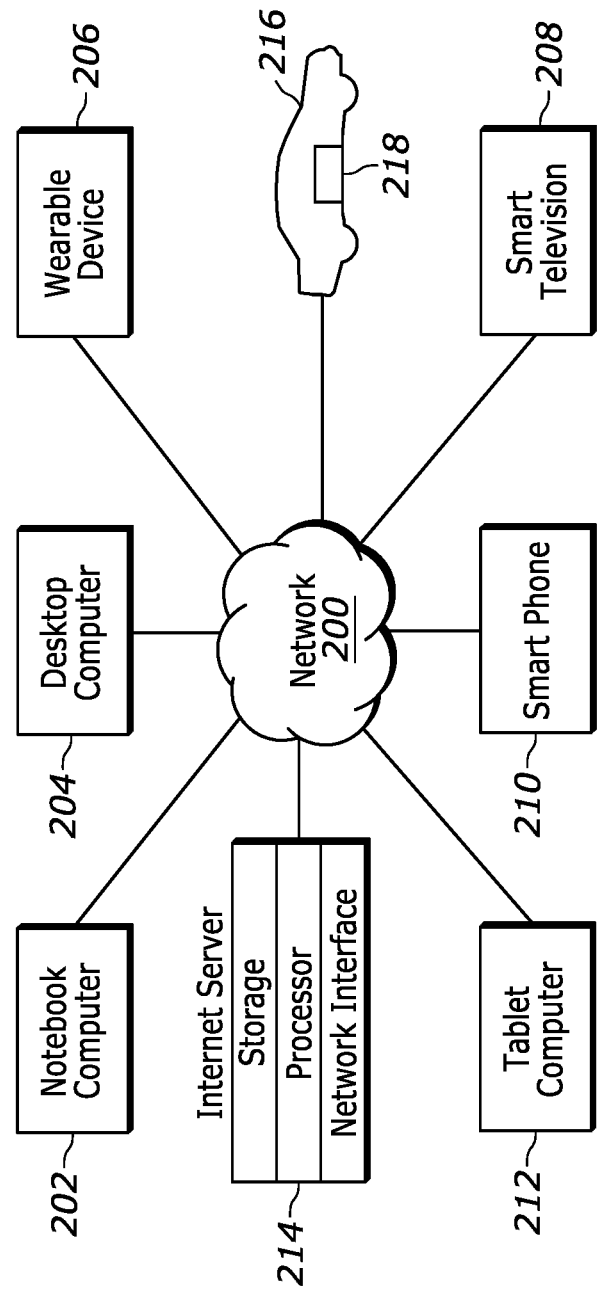
FIG. 2 is a block diagram of an example network of devices consistent with present principles.

Turning now to FIG. 2, example devices are shown communicating over a network 200 such as the Internet or a Bluetooth network in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 may be configured to communicate with each other over the network 200 to undertake present principles. Accordingly, it is to be further understood that the vehicle 216 may include its own on-board computer 218 that may be used for executing functions set forth below as well as communicating with the other devices 202-214.

Figure 3:
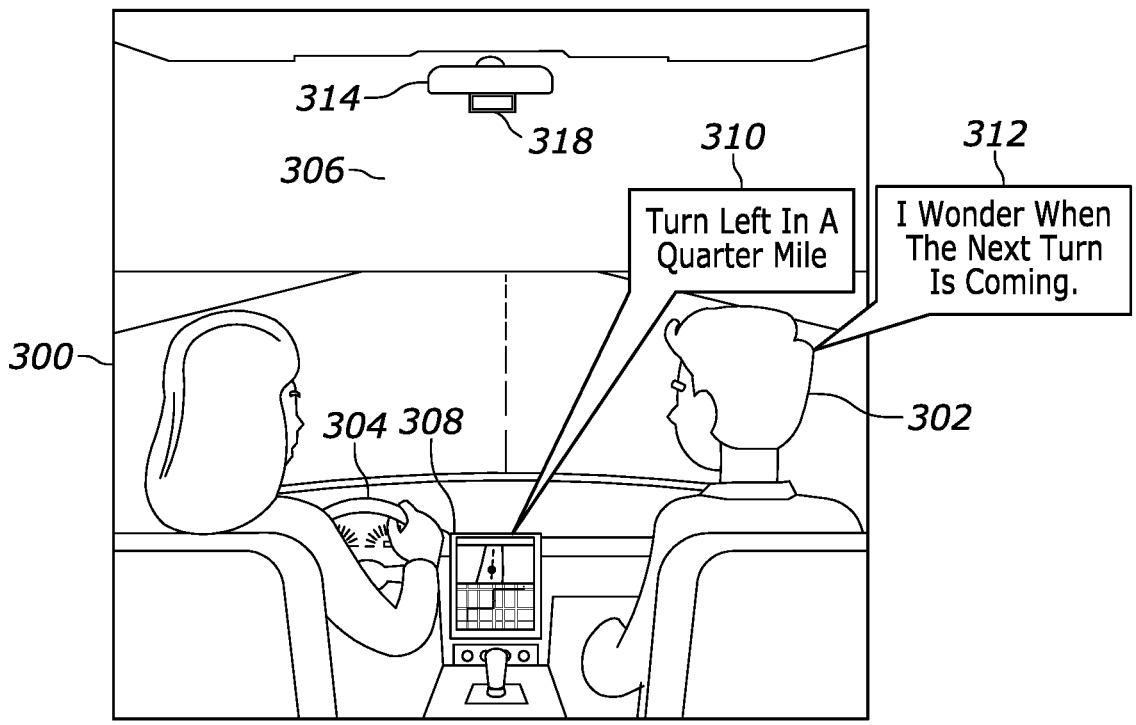
FIG. 3 shows an example illustration of present principles in the context of people within a vehicle while receiving navigational assistance.

Now in reference to FIG. 3, an example illustration consistent with present principles is shown. Here, two people are shown sitting within the vehicle 216 from a perspective within the vehicle's cabin. Accordingly, a driver 300 is shown in the driver's seat, with the driver 300 controlling the vehicle's steering wheel 304. A passenger 302 is shown in the front passenger's seat.

As also shown in FIG. 3, the vehicle 216 is being driven down a road 306 while navigational assistance from a navigational assistance application ("app") is presented both audibly via speakers on the vehicle (not shown) and visually via an on-board display 308 mounted on the dashboard of the vehicle 216. However, as another example, the audible and visual navigational assistance might be presented on one of the occupant's smartphones or via another type of device. But regardless of where presented, assume for this example that the computer-generated voice of the digital assistant that is being executed as part of the app uses a same or similar audio frequency(s) as one or more of those in the frequency range of the voice of the person 302.

Absent principle principles, when the navigational assistance app provides audible output to "turn left in a quarter mile" per speech bubble 310 while the person 302 inadvertently but concurrently says something like "I wonder when the next turn is coming" per speech bubble 312 (or even says something unrelated to navigational assistance altogether), the driver 300 may not be able to sufficiently hear the audible output as provided in the digital assistant's voice owing to the overlapping frequencies. This in turn may cause the driver 300 to fail to take the next step in the navigational assistance, or cause the driver 300 to look down at the display 308 in an unsafe manner while driving.

However, by adopting present principles, the vehicle 216 may determine that the frequency/ranges of the digital assistant's voice and the voice of the person 302 overlap and in turn change the speech frequency(s) used by the digital assistant's voice. For example, the first time the person 302 is in the vehicle, the person 302 may speak or sing as detected by a microphone in the vehicle 216. Audio processing software such as a frequency detector or digital equalizer may then be executed by the computer 218 using the input from the microphone to identify the frequency range in which the person 302 speaks or sings (and/or identify the person's mean, median, and/or mode frequencies). The digital assistant's voice may then be changed to use a different frequency or frequency range than those identified from the person 302.

Additionally, in some examples the on-board computer 218 and/or other device undertaking present principles may create a speech profile for the person 302 and save the person's identified speech frequency/range in the speech profile. The speech profile may be stored in local storage of the vehicle 216, local storage of a paired smartphone communicating over Bluetooth with the vehicle 216, or even cloud storage accessible via a server.

The speech profile may also store voice identification data for the person 302 so that the person 302 may be identified again in another instance through voice identification for the device to then go lookup the person's speech frequency/range from the profile based on the voice identification result. Additionally or alternatively, a camera such as the camera 312 on the lower portion of the rearview mirror assembly 314 may be used to generate facial recognition data for the person 302 that may then be stored in the speech profile. The person 302 may then be identified again in another instance through facial recognition for the device to then go lookup the user's speech frequency/range in the profile based on the facial recognition result. Also note that other forms of identification (ID) may also be used to lookup the correct speech profile data for a given person, including fingerprint ID or even device ID. For example, a smartphone associated with the person 302 may wirelessly broadcast any number of different types of device IDs that may be received and recognized by the vehicle's on-board computer 218, including Internet protocol (IP) address, media access control (MAC) address, and device serial number, each of which might then be used to identify the correct speech profile data for the associated person.

Thus, after the speech profile is created it may be used the next time the person 302 is in the vehicle 216 to dynamically alter the digital assistant's voice to have a different frequency/range than the voice of the person 302 as indicated in the person's profile (and indeed, this might occur each subsequent time the person 302 is determined to be present within the vehicle 216).

However, further note that in addition to or in lieu of the foregoing, the vehicle 216 may simply sample the voice of the person 302 again each subsequent time the person 302 is present to re-identify the person's speech frequency/range and then adjust the digital assistant's voice to a different frequency/range. But in either case, when the person 302 is not present, further note that the digital assistant's voice may go back to being rendered in its previous or default frequency/range (e.g., unless and until another conflicting sound/source is present).

Figure 4:
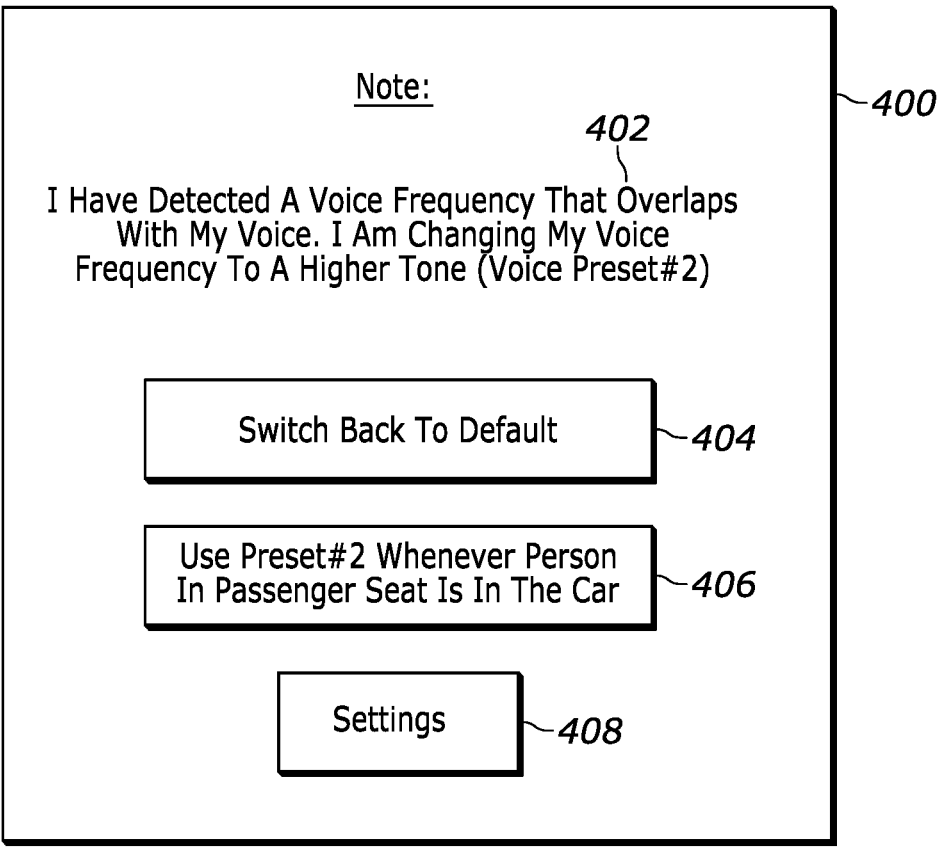
FIG. 4 shows an example graphical user interface (GUI) that may be presented on a display responsive to the changing of an operative voice frequency for a digital assistant.

Continuing with the example above but now in reference to FIG. 4, an example graphical user interface (GUI) 400 is shown that may be presented on the display controlled by the digital assistant/navigational app. For example, the GUI 400 may be preened on the on-board display 308, the display of a paired smartphone, the display of a paired wearable device such as a smart watch, etc.

The GUI 400 may be presented responsive to the device changing the operative audible frequency/range of the digital assistant's voice based on that frequency/range at least partially overlapping the frequency/range of the voice of the person 302. Accordingly, as shown in FIG. 4, the GUI 400 may include a prompt 402 that the digital assistant/navigational app has detected a voice frequency for a human voice that overlaps with the frequency/range of the digital assistant's own computer-generated voice. As also shown, in this example the prompt 402 may indicate that the digital assistant is changing its voice frequency to a higher tone than that of the overlapping frequency of the person's voice. Here, that higher tone is rendered using a different preconfigured speech profile specifically for the digital assistant itself, which in the present example has been generally designated as "voice preset #2".

As also shown in FIG. 4, the GUI 400 may include a selector 404. The selector 404 may be selectable via touch, cursor, or other input to command the device executing the digital assistant to switch back to the digital assistant's previous or default voice frequency/range rather than "voice preset #2" to which it was autonomously changed, should the user so choose. The GUI 400 may also include a selector 406 that may be selectable to command the device to always use "voice preset #2" whenever the person 302 is determined to be present in the vehicle so that the person's voice frequency/range and the digital assistant's voice frequency/range do not overlap in future instances either. Thus, in certain examples selection of the selector 406 may instigate generation of the speech profile for the person 302 as set forth above and/or may otherwise command the device to always use non-overlapping frequencies for the digital assistant's voice whenever the person 302 is determined to be present in the future.

Further note that in some examples the GUI 400 may include a settings selector 408. The settings selector 408 may be selectable to command the device to present another GUI from which one or more additional settings for the digital assistant may be configured consistent with present principles. An example of such a settings GUI will be described later in reference to FIG. 6.

Figure 5:
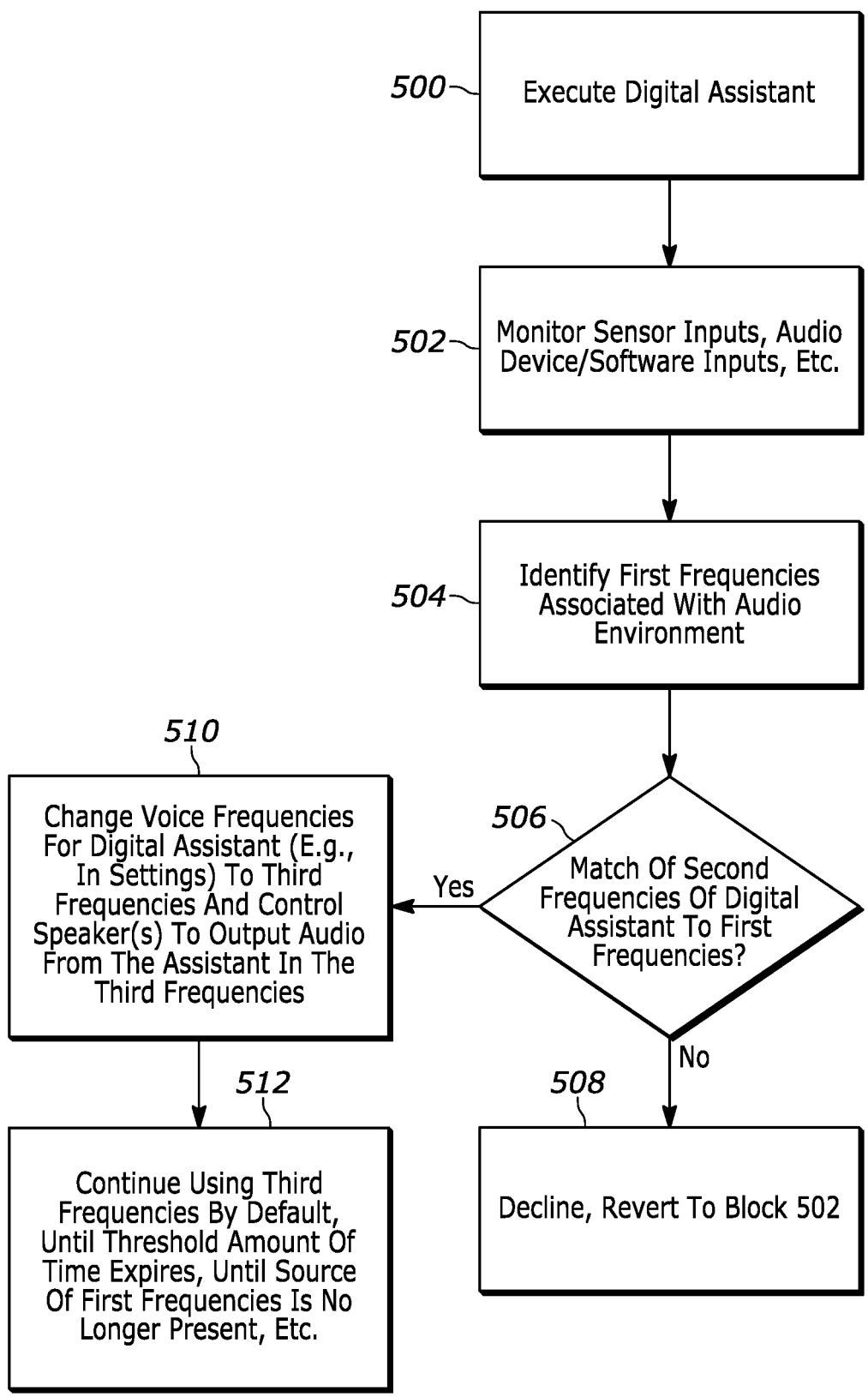
FIG. 5 shows example logic in example flow chart format that may be executed by a device consistent with present principles.

However, first reference is made to FIG. 5. This figure shows example logic that may be executed by a device such as the system 100, the on-board computer 218, a smartphone or other client device, and/or a server in any appropriate combination consistent with present principles. Note that while the logic of FIG. 5 is shown in flow chart format, other suitable logic may also be used.

Beginning at block 500, the device may begin executing a digital assistant, such as responsive to vehicle startup if the assistant is used to interface with a user to initiate telephone calls while driving, send text messages while driving, provide navigational assistance, etc. However, further note that the digital assistant may be executed at other devices and in other contexts as well, such as being executed at a smartphone to respond to audible user input provided to the smartphone or such as being executed at a stand-alone assistant hardware device such as an Amazon Dot or Google Assistant that may similarly respond to audible user input. Thus, the digital assistant may be executed in Internet of things (IoT) environments and/or as part of a connected smart home environment in certain examples. As such, while the digital assistant may be incorporated into a navigational assistance app or other specialty app, it may additionally or alternatively be established by an assistant such as Amazon's Alexa, Google's Assistant, or Apple's Siri that may be executed as its own stand-alone app.

In any case, from block 500 the logic may proceed to block 502. At block 502 the device may monitor sensor inputs such as inputs from connected microphones, cameras, fingerprint sensors, other types of biometric sensors, etc. Additionally or alternatively, the device may monitor connected audio device inputs and/or audio software inputs so that, for example, data signals from a radio, media player, smartphone, or other type of audio renderer (hardware or software) may be analyzed to determine if one or more frequencies/ranges of audio that is being produced by the renderer (as indicated in the data signals) overlap with the voice frequency/range of a given person that is present. This may be done so that, for example, the frequency/range of the digital assistant's voice does not overlap the frequency/range of voices in podcasts, musical songs, news casts, etc. being rendered by the renderer. Ambient sound may also be monitored at block 502 using input from the microphone to determine if any frequency/range of ambient sound overlaps that of the digital assistant's voice (e.g., howling wind).

From block 502 the logic may then proceed to block 504. At block 504 the device may, based on the monitoring performed at block 502, identify one or more first frequencies associated with the local audio environment (e.g., cabin of a vehicle). Thus, the first frequencies may be associated with the local audio environment in that they may be detected via a microphone monitoring the local audio environment, whether those frequencies are related to ambient sound as detected by the microphone, rendered audio as detected by the microphone and produced by a car radio or other audio renderer, or a given person speaking in person as detected by the microphone. Additionally or alternatively, the first frequencies may be associated with the local audio environment in that a user may be identified as present in the local environment even if the user has not spoken yet (e.g. identified using facial recognition, fingerprint ID, or device ID) for the device to then access a speech profile for that user that indicates the (first) frequencies in which the user speaks as already stored in the profile itself as described above. The first frequencies may also be associated with the local audio environment in that they may be reported by an audio renderer over a data connection even if the frequencies are not actually detected by a local microphone, as also set forth above.

From block 504 the logic may then move to decision diamond 506. At diamond 506 the device may determine whether the one or more first frequencies match one or more second frequencies at least to within a threshold. The one or more second frequencies may be the voice frequencies associated with the voice of a digital assistant itself. The threshold may be set by a system administrator, device manufacturer, etc. and may be, for example, plus/minus 5 Hz or another amount still sufficient for a person to audibly distinguish between frequencies/sounds.

Thus, responsive to a negative determination at diamond 506 (the one or more first frequencies do not match the one or more second frequencies at least to within the threshold), the logic may proceed to block 508 where the device may decline to change the one or more frequencies in which the digital assistant speaks and then revert back to block 508. However, responsive to an affirmative determination at diamond 506, the logic may instead proceed to block 510.

At block 510, responsive to the one or more first frequencies matching the one or more second frequencies at least to within the threshold, the device may change a setting for the digital assistant (e.g., frequency setting, voice profile setting, etc.) or otherwise control the frequencies in which the digital assistant speaks in its computer-generated voice so that the digital assistant outputs audio in one or more third frequencies that do not match the one or more first frequencies at least to within the threshold. Thus, at block 510 the device may control one or more connected speakers to output audio in the one or more third frequencies using the digital voice of the digital assistant (rather than outputting the same content in the one or more second frequencies).

From block 510 the logic may then proceed to block 512. At block 512 the device may continue using the third frequencies by default (e.g., as configured as a default setting) until the user manually changes the frequencies again in which the digital assistant is to speak. In another example, at block 512 the device may continue using the third frequencies until a threshold amount of time expires as may be set by an end-user, system administrator, device manufacturer, etc., and then go back to using the one or more second frequencies for the digital assistant's voice responsive to the threshold amount of time ending. The threshold amount of time might be one hour or one day, for example. As another example, at block 512 the device may continue using the third frequencies until the source of the sound in the first frequencies is no longer present (e.g., if a person) and/or until the sound in the first frequencies itself ceases emanating in the audio environment (e.g., if ambient sound, if produced by another device or software, etc.), and thereafter then go back to using the one or more second frequencies responsive to determining that the first frequency source/sound is no longer present in the environment.

Figure 6:
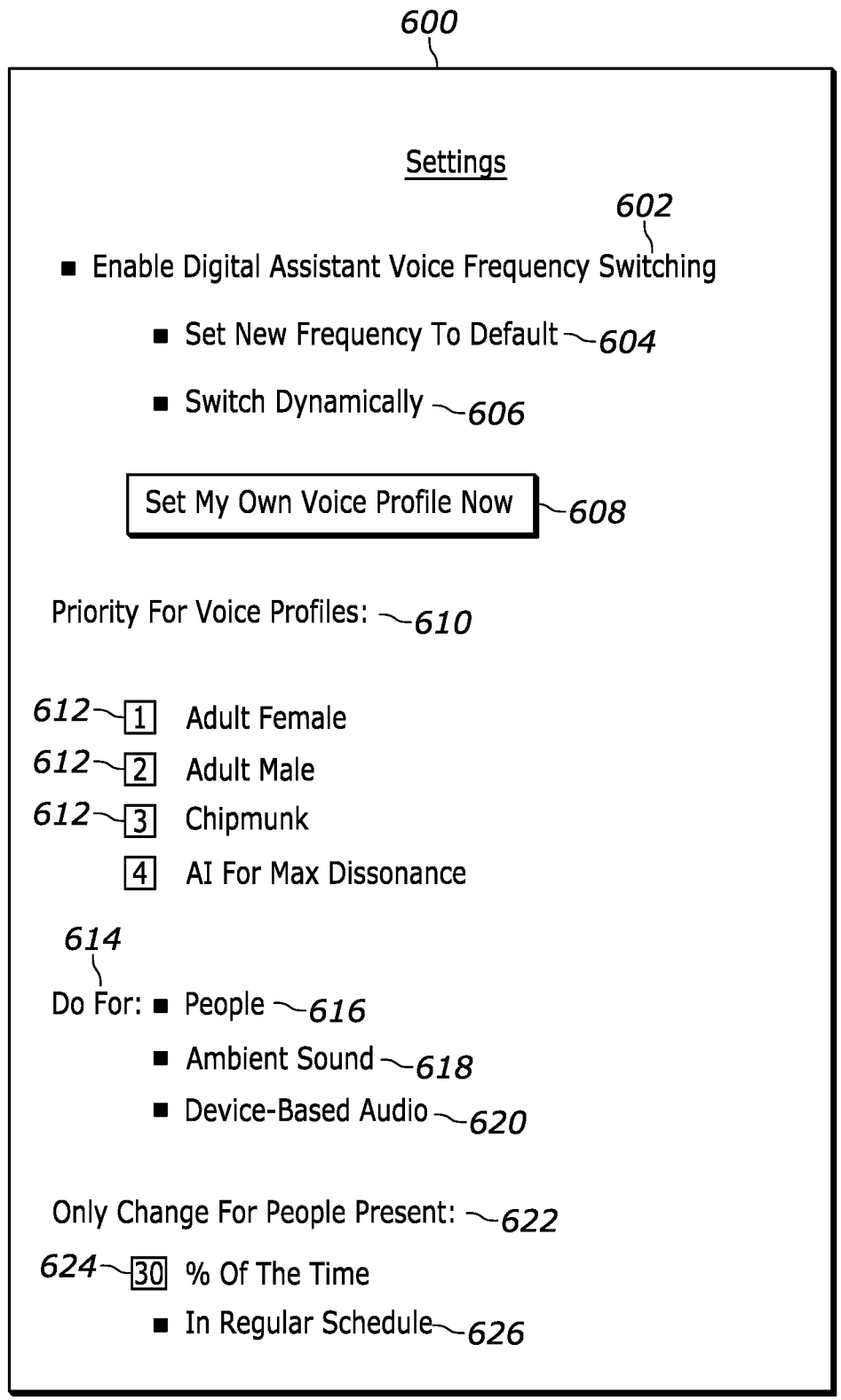
FIG. 6 shows an example GUI that may be presented on a display to configure one or more settings of a device to operate consistent with present principles.

Before moving on to the description of FIG. 6, note with respect to the example logic of FIG. 5 that in some specific non-limiting examples the first frequency source/sound may be required to be present within the audio environment for at least a threshold non-zero amount of time before triggering a change in the digital assistant's voice frequency. The threshold non-zero amount of time may be thirty seconds or another amount of time sufficient to reduce false positives where the first frequency source/sound might be transient but still trigger frequency alteration for the voice of the digital assistant. Thus, per this example the digital assistant may be controlled to output audio in the one or more third frequencies both responsive to the one or more first frequencies matching the one or more second frequencies at least to within the threshold and responsive to determining that the first frequency source/sound is present within the audio environment for at least the threshold non-zero amount of time.

Now in reference to FIG. 6, an example GUI 600 is shown that may be presented on the display of a client device like a smartphone or on-board vehicle computer to configure/enable one or more settings related to voice frequency for a digital assistant consistent with present principles. The settings GUI 600 may be reached by navigating a settings menu of the device or a dedicated app menu for the digital assistant itself. As another example, the settings GUI 600 may be reached by selecting the selector 408 described above. Also note per example FIG. 6 that each option or sub-option discussed below may be selected by directing touch or cursor input to the respective check box adjacent to the respective option.

As shown in FIG. 6, the GUI 600 may include an option 602 that may be selectable a single time to set or configure the device/digital assistant to switch voice frequencies as described herein in multiple future instances of sound frequency overlap. Thus, for example, selection of the option 602 may configure the device/assistant to execute the logic of FIG. 5 as well as to perform other functions mentioned above with respect to FIGS. 3 and 4.

Option 602 may be accompanied by sub-options 604 and 606. Sub-option 604 may be selectable to set the device/assistant to set a new or different frequency(s) to which the assistant's voice has been switched (e.g., the one or more third frequencies from above) as a default to be used moving forward (e.g., even when a person with a conflicting voice frequency that triggered the switch is not present). Sub-option 606 may be selectable to set the device/assistant to dynamically switch between frequencies for the voice of the assistant based on a frequency conflict (while continuing to use an initial or previous default frequency/assistant speech profile where there is no conflict).

As also shown in FIG. 6, the GUI 600 may include a selector 608. The selector 608 may be selectable to initiate a process where a user may configure their own speech profile consistent with present principles. Thus, selection of the selector 608 may take the user through a series of prompts where the user is prompted to speak for the device to then identify the frequency range of the user's voice. The user may also be prompted to provide other data from which the user may be identified (e.g., present their face to a camera for facial recognition data to be generated and stored with the user's speech profile). The user's speech profile may then be used at a later time as set forth above. For example, the user may be later recognized as present within an audio environment via facial recognition, and then the digital assistant's voice frequency range may be changed to not substantially overlap the voice frequency range of the user as identified from the user's own speech profile. For example, the digital assistant's voice frequency range may be changed to be respectively higher or lower than the respective upper or lower bound of the user's voice frequency range by more than a threshold amount so that the two voices (user and assistant) are not mistaken as being from one person. E.g., the digital assistant's voice frequencies may be changed to be at least five or ten Hz higher than the upper bound of the user's speech frequency range, or to be at least five or ten Hz lower than the lower bound of the user's speech frequency range.

FIG. 6 further shows that a setting 610 may be included where an end-user can set a priority for which of the digital assistant's own voice profiles the digital assistant itself should use for its voice when there is a conflict/overlap (or not) with other sound in the audio environment. Each profile may be given a certain priority by the user by entering numerical input to a respective input box 612. In this example, a preconfigured adult female voice (range 180-185 Hz) is given the highest priority level of one, a preconfigured adult male voice (range 100-105 Hz) is given the next-highest priority level of two, and a chipmunk voice (350-355 Hz) is given the next-highest priority level of three. Also note that another digital assistant voice profile option may be included in the rankings as shown, with this profile being for an artificial intelligence-based model that may dynamically generate a voice for the digital assistant to employ that results in max frequency dissonance relative to one or more other frequencies in the audio environment (e.g., max dissonance with the voice of a person that is currently present in the audio environment). For example, an artificial intelligence voice generator or deepfake software may be used to generate a non-conflicting voice on the fly rather than using an available, preconfigured digital assistant voice profile for the voice.

If desired, in some examples the GUI 600 may also include a setting 614 at which the user may select different types of sound for which the voice frequency of the digital assistant's voice should be changed when there is a conflict. Thus, option 616 may be selected to select people currently present within the audio environment, option 618 may be selected to select ambient sound currently present within the audio environment, and option 620 may be selected to select device-based audio currently present within the audio environment (e.g., music or a newscast being presented using a speaker).

What's more, in some examples the GUI 600 may also include a setting 622 at which the user may set one or more additional conditions for changing the voice frequency of the digital assistant's voice. The user may therefore direct numerical input to input box 624 to establish that the digital assistant's voice should only be changed when it conflicts with the voice frequency range of a person that themselves is present a threshold percent of the total time that the digital assistant is active/executing (e.g., over a rolling most-recent span of total time). Option 626 may be selected to set the digital assistant to only change to a non-conflicting voice frequency/range during future times that match past regular time intervals at which the conflicting person was present (e.g., every Monday, each first day of the month, etc.). Thus, the setting 622 may be used to limit the amount of times the digital assistant's voice may be changed so that it is only changed to a dissonant frequency when people with conflicting voice frequencies are consistently present.

Moving on from FIG. 6 but before concluding, as an example use case a device operating consistent with present principles may establish a voice profile for each occupant of a vehicle, where there are more than two occupants in the vehicle. Each voice profile may indicate the respective occupant's speech frequency range and/or the occupant's most commonly-used speech frequency, as well as other data that may be used to identify the occupant themselves (e.g., a fingerprint template, facial recognition data, etc.). The device itself may then pick a digital assistant voice frequency/range that differs from that of each occupant. Furthermore, if available pre-configured voice profiles for the assistant do not result in a frequency difference of more than a threshold amount relative to each voice of each the occupant, the device can auto-adjust the assistant's voice using an artificial intelligence model to generate a voice with a maximally dissonant frequency relative to a cross-section of all the occupant voices it has detected.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
identify a first frequency range of sound associated with an environment;
determine whether the first frequency range matches a second frequency range at least to within a threshold, the second frequency range associated with a voice of a digital assistant; and
responsive to the first frequency range matching the second frequency range at least to within the threshold, change a setting for the digital assistant so that the voice of the digital assistant outputs audio in a third frequency range that does not match the first frequency range at least to within the threshold;
wherein the first frequency range is identified from a profile associated with a person, the person determined to currently be within the environment.

2. The first device of claim 1, wherein the instructions are executable to:
responsive to the first frequency range not matching the second frequency range at least to within the threshold, decline to change the setting for the digital assistant.

3. The first device of claim 1, comprising at least one speaker, wherein the instructions are executable to:
based on changing the setting, control the speaker to output audio in the third frequency range using the voice of the digital assistant.

4. The first of claim 1, wherein the person is determined to be currently within the environment via facial recognition.

5. The first device of claim 1, wherein the person is determined to be currently within the environment via voice identification.

6. The first device of claim 1, wherein the person is determined to be currently within the environment via device identification.

7. The first device of claim 1, wherein the instructions are executable to:
responsive to the first frequency range matching the second frequency range at least to within the threshold, output audio for a threshold amount of time in the third frequency range; and
responsive to the threshold amount of time ending, revert to outputting audio in the second frequency range.

8. The first device of claim 1, wherein the instructions are executable to:
responsive to the first frequency range matching the second frequency range at least to within the threshold, output audio in the third frequency range while the person is present in the environment; and
responsive to determining that the person is no longer present in the environment, revert to outputting audio in the second frequency range.

9. A method, comprising:
identifying a first frequency range of sound associated with an environment;
determining whether the first frequency range matches a second frequency range at least to within a threshold, the second frequency range associated with a voice of a digital assistant;
responsive to the first frequency range matching the second frequency range at least to within the threshold, controlling the digital assistant to output audio in a third frequency range that does not match the first frequency range at least to within the threshold, the digital assistant controlled to output audio in the third frequency range while a person associated with the first frequency range is present in the environment; and
responsive to determining that the person is no longer present in the environment, subsequently controlling the digital assistant to output audio in the second frequency range.

10. The method of claim 9, wherein the first frequency range is identified from a profile associated with the person.

11. The method of claim 10, wherein the person is determined to be currently within the environment via facial recognition.

12. The method of claim 10, wherein the person is determined to be currently within the environment via voice identification.

13. The method of claim 10, wherein the person is determined to be currently within the environment via device identification.

14. The method of claim 9, comprising:
identifying a fourth frequency range of sound associated with the environment;
determining whether the fourth frequency range matches the second frequency range at least to within the threshold;
responsive to the fourth frequency range matching the second frequency range at least to within the threshold, output audio for a threshold amount of time in a fifth frequency range; and
responsive to the threshold amount of time ending, revert to outputting audio in the second frequency range.

15. The method of claim 14, wherein the fifth frequency range is different from the second frequency range.

16. At least one computer readable storage medium (CRSM) that is not a transitory signal, the at least one CRSM comprising instructions executable by at least one processor to:
identify a first frequency range of sound;
determine whether the first frequency range matches a second frequency range at least to within a threshold, the second frequency range associated with a voice of a digital assistant;
responsive to the first frequency range matching the second frequency range at least to within the threshold, control the digital assistant to output audio for a threshold amount of time in a third frequency range that is different from the first frequency range and that is different from the second frequency range; and
responsive to the threshold amount of time ending, subsequently control the digital assistant to output audio in the second frequency range.

17. The at least one CRSM of claim 16, wherein the threshold amount of time is a first threshold amount of time, and wherein the instructions are executable to:
determine that a person is present within an audio environment for at least a second threshold amount of time; and
responsive to determining that the person is present within the audio environment for at least the second threshold amount of time, control the digital assistant to output audio in the third frequency range.

18. The at least one CRSM of claim 16, wherein the digital assistant is executed as part of navigational assistance provided via a navigational assistance application.

19. The at least one CRSM of claim 16, wherein the instructions are executable to:
identify a fourth frequency range of sound;
determine whether the fourth frequency range matches the second frequency range at least to within the threshold;
responsive to the fourth frequency range matching the second frequency range at least to within the threshold, control the digital assistant to output audio in a fifth frequency range while a person associated with the fourth frequency range is present; and
responsive to determining that the person is no longer present, subsequently control the digital assistant to output audio in the second frequency range.

20. The at least one CRSM of claim 19, wherein the fifth frequency range is the same as the second frequency range.

* * * * *